Figure 1:
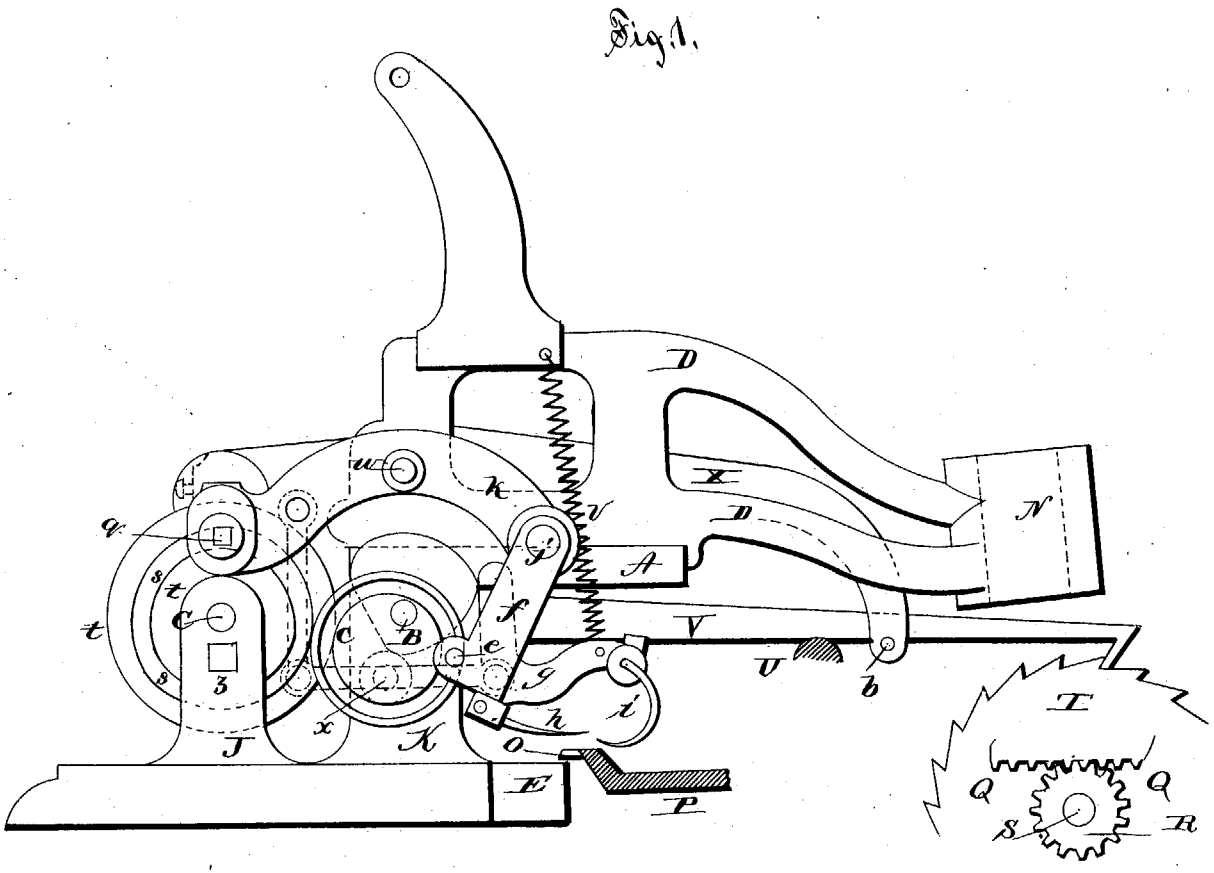

3 Sheets—Sheet 1.

J. CLUTE,

Assignor to CAMPBELL & CLUTE.

MACHINE FOR UNITING KNIT FABRICS.

No. 10,764. Reissued Sept. 21, 1886.

*WITNESSES*

F. L. Ourand

Rex. Smith

*INVENTOR*

John Clute by A. M. Smith

*Attorney*

N. PETERS, Photo-Lithographer, Washington, D. C.

3 Sheets—Sheet 2.

J. CLUTE,

Assignor to CAMPBELL & CLUTE.

MACHINE FOR UNITING KNIT FABRICS.

No. 10,764. Reissued Sept. 21, 1886.

WITNESSES

F. L. Oxnard.

Rex Smith.

INVENTOR

John Clute by A. M. Smith

Attorney

N. PETERS, Photo-Lithographer, Washington, D. C.

J. CLUTE,
Assignor to CAMPBELL & CLUTE.

MACHINE FOR UNITING KNIT FABRICS.

No. 10,764. Reissued Sept. 21, 1886.

WITNESSES
F. L. Ozyand
Rex Smith

INVENTOR
John Clute
by A. M. Smith
Attorney

N. PETERS, Photo-Lithographer, Washington, D. C.

UNITED STATES PATENT OFFICE.

JOHN CLUTE, OF COHOES, NEW YORK, ASSIGNOR TO CAMPBELL & CLUTE, OF SAME PLACE.

MACHINE FOR UNITING KNIT FABRICS.

SPECIFICATION forming part of Reissued Letters Patent No. 10,764, dated September 21, 1886.

Original No. 344,897, dated July 6, 1886. Application for reissue filed July 27, 1886. Serial No. 209,272.

DIVISION B.

*To all whom it may concern:*

Be it known that I, JOHN CLUTE, of Cohoes, county of Albany, and State of New York, have invented a certain new and useful Improvement in Machines for Uniting Knit Fabrics, of which the following is a full, clear, and exact description, reference being had to the accompanying drawings, making a part of this specification.

My invention relates to improvements in double-stitch seams for uniting knit fabrics.

The object of my invention is to provide a seam that will be securely knotted or fastened in each stitch, so that when the seam is cut across or severed at any time by accident or otherwise the ends will not unravel or become loosened.

A second object is to provide a seam that will be more elastic than those heretofore known or used, so that when the knit fabrics united by the seam are stretched or extended in the direction of the seam the threads of the seam will not be broken by the strain, but will yield as the fabric is extended and contract when the strain is relaxed.

In that class of turning-off machines described in Letters Patent No. 228,802, dated June 15, 1880, and known as "circular" turning-off machines, used in sewing together the two selvage or looped edges of knitted or looped fabrics, the "points" carrying the edges of the fabric are arranged in a circle and project radially from a revolving "cylinder," so called, of suitable form and construction, and provided with suitable appliances for carrying the points and bringing and holding them successively under the needle while a single or double stitch is formed.

In machines of this class, known as "double-stitch cylinder turning-off machines," a single stitch is made in the usual manner, and the cylinder remains stationary until a second stitch is formed above the other, the two stitches constituting what is called a "double stitch." After a double stitch is thus formed, the cylinder, moving, brings the next point under the needle, when another double stitch is formed, and an elastic seam is thus produced.

In forming the second stitch—that is to say, the second part of a double stitch—the needle and the looper, by suitable mechanism, are raised above the fabric high enough to allow the needle to pass over the fabrics at the time when it would otherwise have passed again through the selvage or looped edges, and the second part of the double stitch is completed while the needle and looper are above the fabrics. The double-stitch seam thus formed is known as the "over-and-under double-stitch seam."

The seam of my invention, to distinguish it from the one just described, may be called the "through-and-through double-stitch seam."

To produce my through-and-through double-stitch seam, I render inoperative or do away with the mechanism for raising the needle and looper above the fabrics, and after the first part of the stitch is made in the usual manner, and while the cylinder remains in the same position, the second part of the stitch—that is to say, the second stitch of the two stitches forming the through-and-through stitch—is made, the needle in forming it being allowed or caused to pass through the selvage or looped edges in exactly the same place and manner as in forming the first part of the same stitch. After a double through-and-through stitch is thus formed, the cylinder, moving, brings the next point under the needle, when another double through-and-through stitch is formed, and the elastic seam produced by continuing this operation constitutes the through-and-through double-stitch seam of my invention.

Any suitable mechanism may be employed in producing my invention, the essential requirements of the mechanism so employed being such that the selvage or looped edges of the fabric will be held in the proper position, while the needle passing through twice in the same place forms a through-and-through stitch, and that the fabrics will be then moved to the proper position to receive the second through-and-through stitch, and so on until the required through-and-through double-stitch seam is formed.

Figure 2:
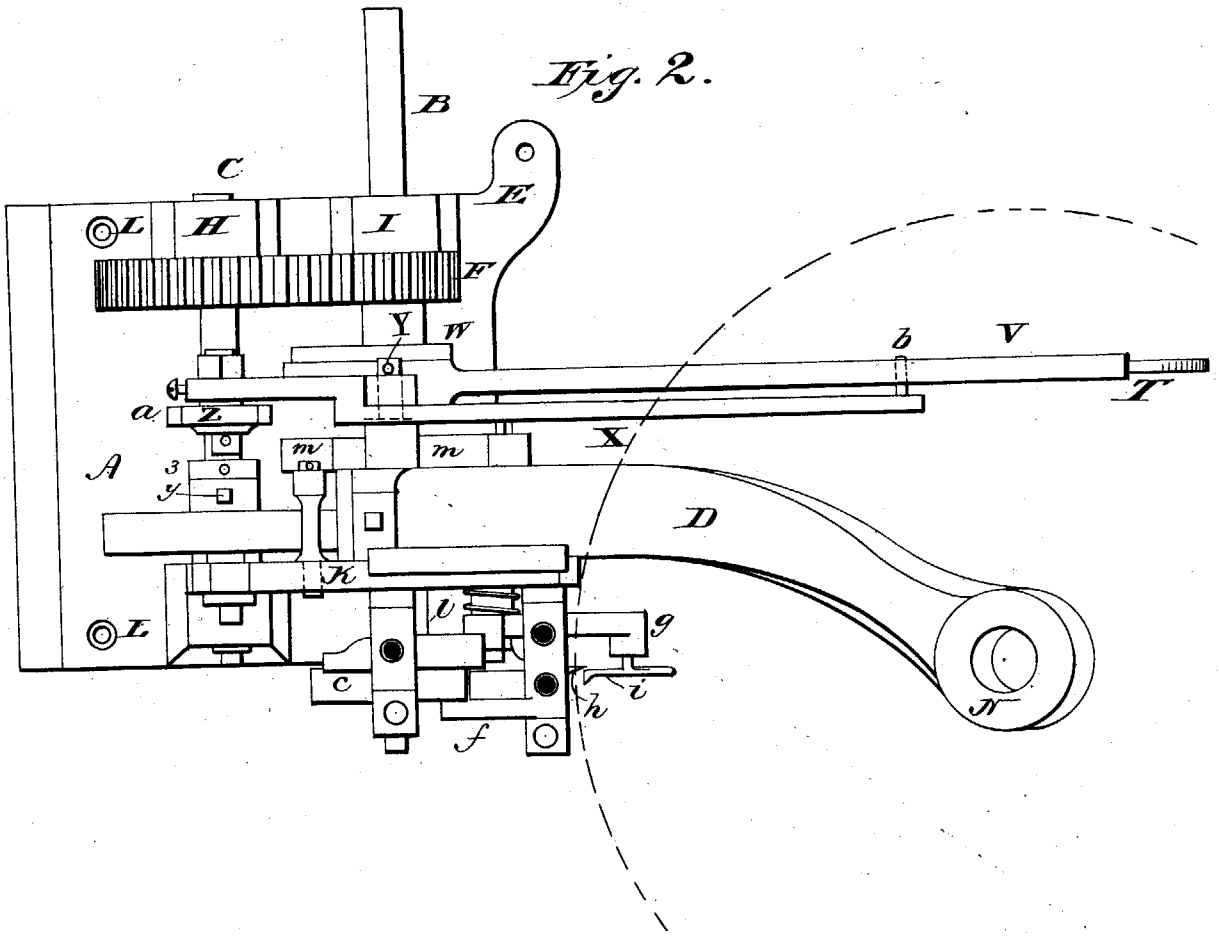
Figure 3:
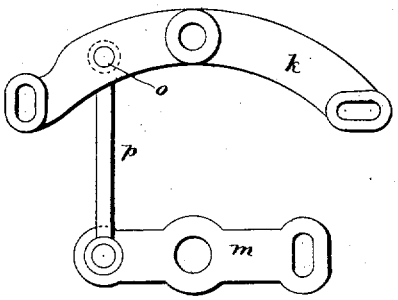
Figure 4:
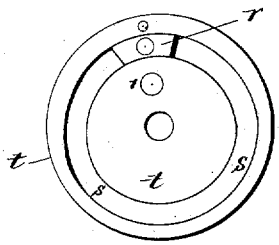
Figure 5:
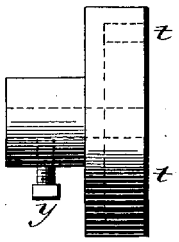
Figure 6:
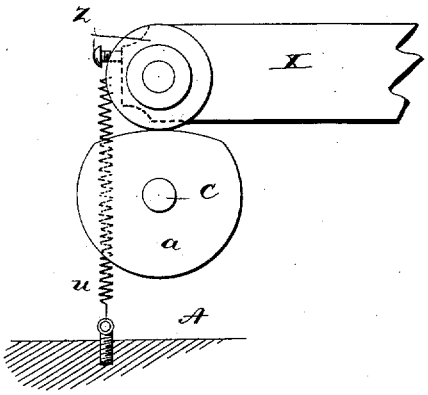
Figure 7:
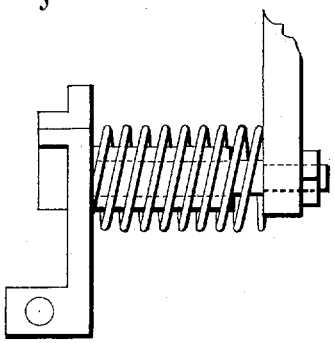
Figure 8:
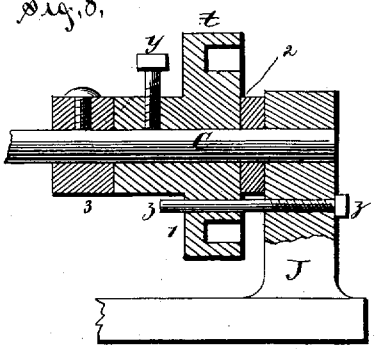

In the accompanying drawings, Figure 1 is a side elevation of a double-stitch cylinder turning-off machine having my improvements, and with certain details omitted. Fig. 2 is a plan view of the same. Fig. 3 is a side elevation of the needle-arm lever, the looper-holder lever, and the connecting-rod. Figs. 4 and 5 represent the counter-shaft cam and cam-block; Fig. 6, the trip-lever cam, roller, and spring, and a part of the trip-lever; Fig. 7, the looper-holder and spring, the end of the looper-holder lever, and the connecting bolt or stud; Fig. 8, the cam-fastening and details.

A is the supporting frame or stand, which may be of any suitable form for carrying the parallel axles B and C and the projecting arm D.

In the drawings, the axle B is the needle and looper-cam axle, which projects beyond the frame, and in practice carries the driving-pulley and shipping devices.

E is a lug to carry the shipper-lever. The shipping-lever and the driving-pulley are not shown in the drawings. The axle C in the counter-shaft is parallel to axle B, and is driven by the spur-wheels F and G at one-half the speed of the axle B. Axles B and C revolve in suitable bearings in uprights H, I, J, and K. By means of screws through the screw-holes L the frame or stand A may be secured to the top of a bench or table near its edge in such manner or position that the cylinder will project laterally therefrom. The outer or overhanging end of the arm D is provided with a hub, N, bored to receive the cylinder-axle in the usual manner. The cylinder is not shown in the drawings, because the construction of such cylinders is too well known to require description here, and the parts of a cylinder necessary to a description of my invention are sufficiently indicated in Figs. 1 and 2. The cylinder may be of any suitable form and construction for carrying the points O and bringing them successively into their proper position under the needle.

P is a ring, usually of brass, into which the points O tightly fit. An incomplete section of the ring P and a point, O, are represented in Fig. 1, and a circle of the points is indicated by a dotted line in Fig. 2. The cylinder is revolved by a circular rack, Q, driven by a pinion, R, on the axle S of the ratchet-wheel T. The number of teeth on the rack is so proportioned to the number of teeth on the pinion and on the ratchet-wheel that the latter in moving one tooth will move the cylinder enough to carry the points the distance required for each double stitch, or for each single stitch when the machine is used for making a single-stitch seam.

U is the fulcrum-post, usually employed, in connection with the eccentric or pawl-rod V and eccentric W, for working the ratchet-wheel T. The eccentric W is carried by the axle B.

The trip-lever X has its fulcrum in a pin or stud, Y, projecting from the arm D. One end of the trip-lever X is provided with a friction-roller, Z, which rests on the trip-lever cam *a* and receives its motion therefrom. The trip-lever cam in its cylindrical part is concentric with the counter-shaft C, and the other end of lever X is so curved that the bearing *b* does not interfere with the action of the pawl-rod V, while the roller Z rests upon the cylindrical part of cam *a*. The cam *a* is flattened on a part of its face, as shown in Fig. 6, in such manner that when the roller Z rests upon the flattened part the pawl V will be lifted, and, resting upon pin *b*, cannot move the ratchet. When the machine is in operation forming a double-stitch seam, the parts are so adjusted that the pawl-rod V will be raised in time to prevent the movement of the ratchet while the second part of the double stitch is made.

*c* is the needle-cam, and *d* is the looper-cam. Both are of the usual form, are carried by the axle B, and operate in the usual manner. A cam-block (not visible in the drawings) moves in the cam-groove of cam *c* and receives the pin *e* of the needle-arm *f*.

*g* is the looper-holder.

*h* is the needle, and *i* the looper.

The stud *j* of the needle-arm is attached to one end of the needle-arm lever *k*. The stud *l* of the looper-holder is attached to one end of the looper-holder lever *m*. The other end of the lever *m* is connected with a stud, *o*, on lever *k* by a connecting-rod, *p*. The end of the lever *k* nearest the stud *o* is provided with a pin, *q*, inserted in a cam-block, *r*. The cam-block *r* fits loosely in the cam-groove *s* of cam *t* on the counter-shaft C. The cam *t* may have either a groove, *s*, as shown in the drawings, or the end of lever *k* may be provided with a friction-roller and a suitable weight or spring to hold it down on the face of the cam in a manner similar to that shown in Fig. 6. The form of cam *t* (clearly shown in the drawings) is such that each revolution of the counter-shaft will once raise and once lower the cam end of lever *k*, and thereby raise and lower simultaneously the needle and looper when properly connected with or attached to that lever. The several parts must be so proportioned and adjusted that the needle and looper will be lowered to form a single stitch—that is to say, the first part of a double stitch—and raised to form the second part of a double stitch. When a single-stitch seam is to be made, the spur-wheel G is moved along the counter-shaft C and thrown out of gear with wheel F, and said counter-shaft and cam *t* thereon fixed in such a position that the cam-block *r* will be held at its highest point, thus allowing the needle and looper to remain at their lowest working limit. The cam *a* on said counter-shaft, which is now fixed and inoperative, is also adjusted and fixed in such position and relation to the roller Z on the trip-lever X that said roller and that end of the lever will be elevated and the other end of the lever depressed correspondingly, this allowing the pawl-arm V to always engage and drive the ratchet-wheel T. Thus it will be seen that the axle C, eccentrics *t* and *a*, and the trip-lever X will all be inoperative and at rest, and the pawl-arm V will operate the wheel T at each revolution of the axle B, and thereby cause a single row of stitches to be formed.

*v* is the looper-holder spring, (see Fig. 1,) and *u* is the spring (see Fig. 6) for holding the trip-lever roller Z against the face of the cam. The lever *k* has its fulcrum on a stud, *w*, projecting over the needle-cam, and the lever *m* has its fulcrum on a stud, *x*, on the opposite side of the upright column K. The stud *x* is shown in dotted lines in Fig. 1.

To form a through-and-through double-stitch seam with this machine, which must be accomplished without raising the needle and looper above the fabrics in forming the second part of the double stitch, the set-screw *y* is loosened or taken out, so as to allow the cam *t* to revolve freely on the counter-shaft, and the cam is turned on the shaft until the needle and looper are brought into their lowest positions, and until the fastening-pin *z*, passing through the column J, will enter the hole 1 of the cam and fix said cam to column J, so that it cannot rotate. It will thus be seen that since the cam *t* cannot rotate the needle and looper will not be raised, and will always operate in the same plane. The cam *a*, however, will still act upon the trip-lever, and cause it to lift the pawl-arm V, for the purpose of allowing the ring to remain stationary until the second stitch is formed.

2 and 3 are suitable collars to prevent the cam *t* from moving endwise on the counter-shaft.

Having thus described my invention, what is claimed under this division of the application is—

In a machine for uniting knit fabrics, the intermittently-rotating cylinder carrying the fabric and remaining stationary while a second stitch is being formed, in combination with the needle and looper which form a second stitch in the same plane with that in which the first or preceding stitch was taken, thereby forming the through-and-through or double stitch, substantially as described.

In testimony whereof I have hereunto set my hand this 17th day of July, A. D. 1886.

JOHN CLUTE.

Witnesses:
MURRAY HUBBARD,
DAVID R. SMITH.